United States Patent
Sato et al.

[11] Patent Number: 5,953,910
[45] Date of Patent: Sep. 21, 1999

[54] ENGINE AIR-FUEL RATIO CONVERTER WITH MEANS FOR DETERMINING THE DETERIORATION OF THE CATALYTIC CONVERTER

[75] Inventors: Ritsuo Sato; Kimiyoshi Nishizawa, both of Yokohama, Japan

[73] Assignee: Nissan Motor Co., Ltd., Yokohama, Japan

[21] Appl. No.: 08/982,043

[22] Filed: Dec. 1, 1997

[30] Foreign Application Priority Data

Nov. 29, 1996 [JP] Japan ................................. 8-320075

[51] Int. Cl.⁶ ............................................ F01N 3/00
[52] U.S. Cl. ................................................ 60/277; 60/285
[58] Field of Search ............................. 60/274, 276, 277, 60/285; 73/118.1

[56] References Cited

U.S. PATENT DOCUMENTS 5,088,281  2/1992  Izutani et al. .
5,255,662  10/1993  Nakajima .
5,732,552  3/1998  Matsumoto et al. ..................... 60/227

FOREIGN PATENT DOCUMENTS 2-30915   2/1990  Japan .
5-106493  4/1993  Japan .
5-106494  4/1993  Japan .

Primary Examiner—Thomas E. Denion
Attorney, Agent, or Firm—Foley & Lardner

[57] ABSTRACT

An air-fuel ratio is feedback corrected based on an output signal from a first oxygen sensor situated upstream of a catalyst, and an updating amount of a feedback correction coefficient is modified based on a difference between an output signal from a second sensor situated downstream of the catalyst and a preset slice level SLR1. Catalyst deterioration is determined based on a ratio of a fluctuation frequency of the output signal of the first oxygen sensor exceeding a slice level SLF and the fluctuation frequency of the output signal of the second oxygen sensor exceeding a slice level SLR2. By setting the slice level SLR1 to a different value when deterioration diagnosis of the catalyst is being performed from when the diagnosis is not being performed, the effect of varying the updating amount on deterioration diagnosis of the catalyst is eliminated.

14 Claims, 12 Drawing Sheets

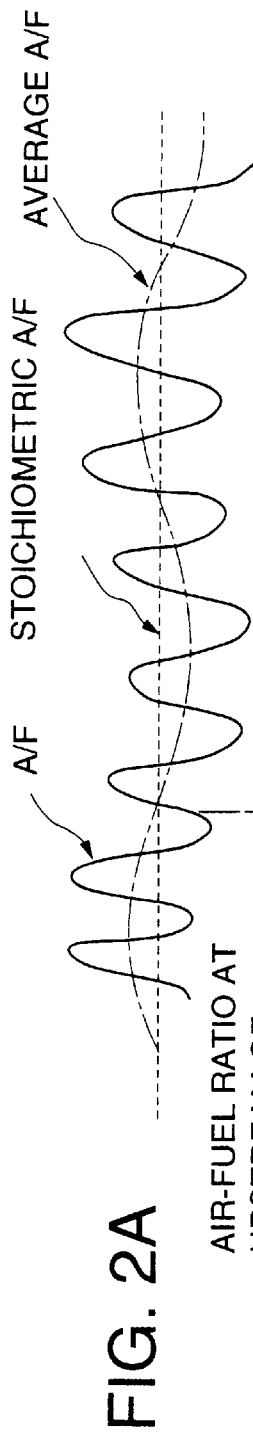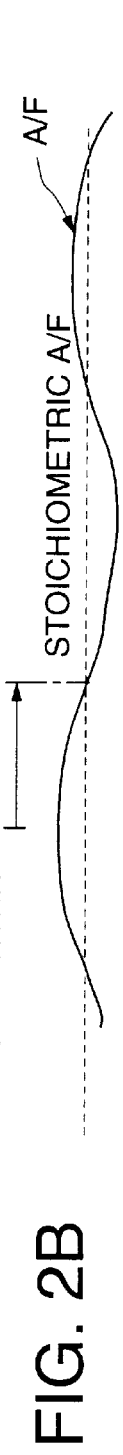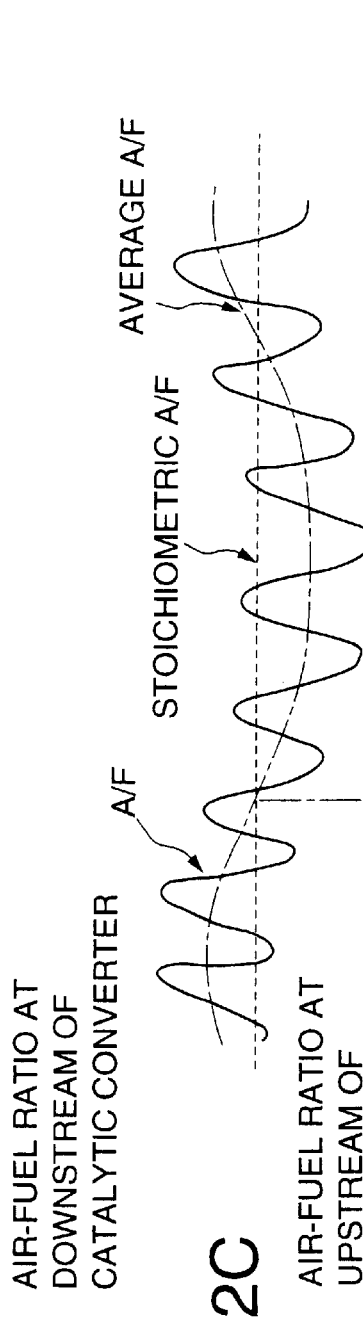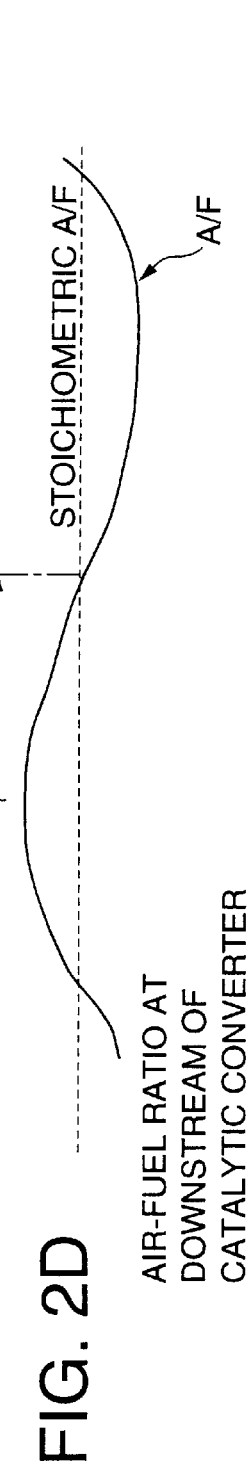
FIG. 2A AIR-FUEL RATIO AT UPSTREAM OF CATALYTIC CONVERTER
FIG. 2B AIR-FUEL RATIO AT DOWNSTREAM OF CATALYTIC CONVERTER
FIG. 2C AIR-FUEL RATIO AT UPSTREAM OF CATALYTIC CONVERTER
FIG. 2D AIR-FUEL RATIO AT DOWNSTREAM OF CATALYTIC CONVERTER

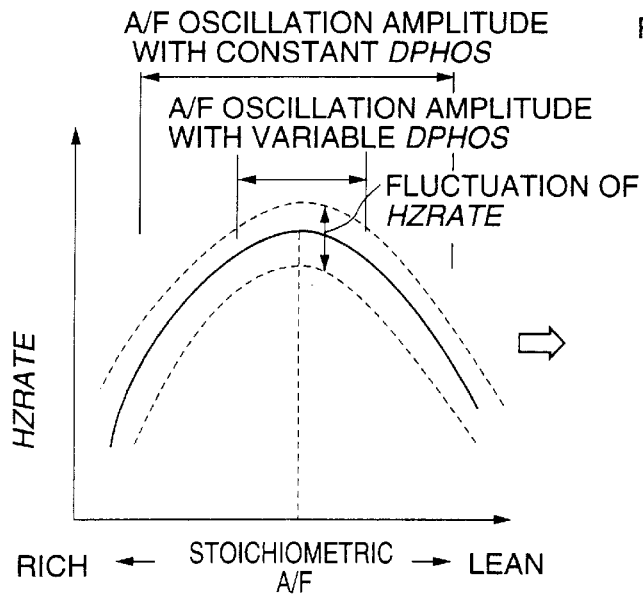
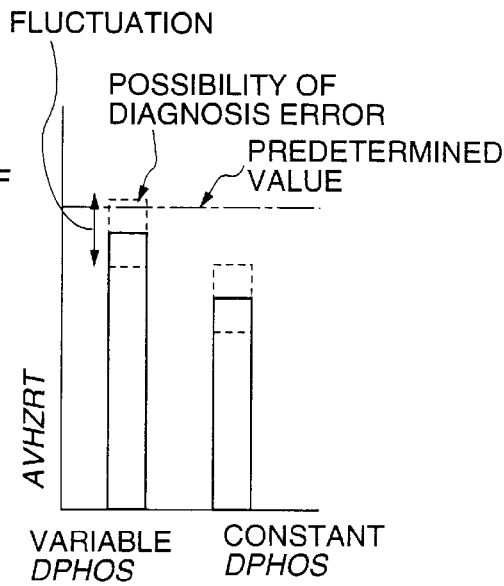
FIG. 3A
FIG. 3B
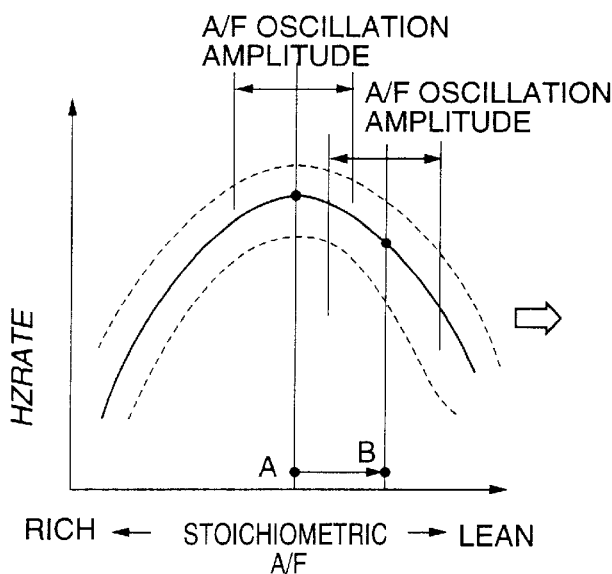
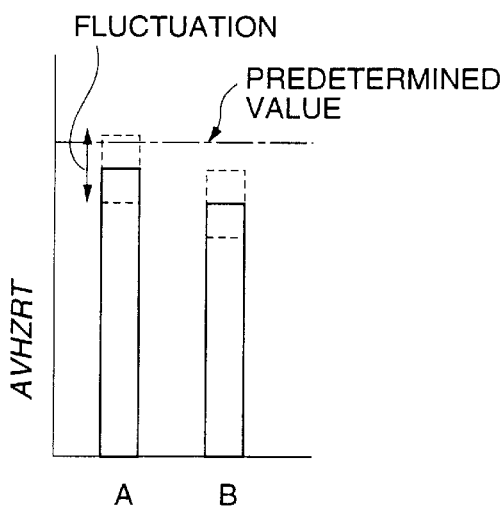
FIG. 4A
FIG. 4B

WHEN DIAGNOSIS IS NOT PERFORMED

FIG. 10A  OSRR

FIG. 10B  PHOS

WHEN DIAGNOSIS IS PERFORMED

WHEN DIAGNOSIS IS NOT PERFORMED

FIG. 12A OSRR

FIG. 12B PHOS

WHEN DIAGNOSIS IS PERFORMED

ENGINE AIR-FUEL RATIO CONVERTER WITH MEANS FOR DETERMINING THE DETERIORATION OF THE CATALYTIC CONVERTER

FIELD OF THE INVENTION

This invention relates to air-fuel ratio control and to catalyst deterioration diagnosis in a vehicle engine.

BACKGROUND OF THE INVENTION

Devices in which an $O_2$ sensor is provided upstream and downstream of a catalytic converter of a vehicle engine, and an output signal from the two sensors is compared so as to diagnose deterioration of the catalyst, are disclosed in Tokkai Hei 2-30915 published in 1990, and Tokkai Hei 5-106493, Tokkai Hei 5-106494 published in 1993 by the Japanese Patent Office.

In these diagnostic devices, the catalyst is determined to have deteriorated when a ratio of an oscillation frequency of an output signal from the downstream $O_2$ sensor and an oscillation frequency of an output signal from the upstream $O_2$ sensor is greater than a predetermined value. These oscillation frequencies are calculated as a number of times the output signal crosses a preset slice level.

These devices comprise one part of an air-fuel ratio feedback controller that, based on the output of the upstream $O_2$ sensor, feedback control a fuel quantity so that an air-fuel ratio of an air-fuel mixture supplied to an engine reaches a preset target value. The air-fuel ratio feedback control is proportional integral control (PI control), and as a result, the output of the upstream $O_2$ sensor periodically fluctuates between rich and lean.

U.S. Pat. No. 5,255,662 discloses varying an updating amount of air-fuel ratio feedback correction coefficient according to the difference between the output signal from the downstream $O_2$ sensor and a predetermined slice level instead of applying a fixed updating amount.

This method of updating the air-fuel ratio feedback correction coefficient reduces the oscillation amplitude of the air-fuel ratio feedback correction coefficient compared to the case where the updating amount is a fixed value.

In this case, the output signal from the $O_2$ sensor fluctuates with a smaller period than when the updating amount is a fixed value, and the number of times that the output signal from the downstream $O_2$ sensor cuts across the slice level therefore increases. This leads to an increase of the aforesaid frequency ratio. As a result in this type of air-fuel ratio controller, when the aforesaid catalyst deterioration diagnosis was performed, it may be incorrectly determined that the catalyst had deteriorated when in fact it was operating normally.

SUMMARY OF THE INVENTION

It is therefore an object of this invention to update an air-fuel ratio feedback correction coefficient according to an output signal from a downstream $O_2$ sensor without affecting a catalyst deterioration diagnosis.

In order to achieve the above object, this invention provides an air-fuel ratio controller for performing feedback control of an air-fuel ratio of an engine based on an air-fuel ratio feedback correction coefficient. The engine discharges exhaust gas via an exhaust passage fitted with an exhaust purifying catalyst.

The controller comprises a first oxygen sensor provided upstream of the catalyst in the passage. The first oxygen sensor generates a signal indicative of an oxygen concentration in the exhaust gas which flows past the first oxygen sensor.

The controller comprises a second oxygen sensor provided downstream of the catalyst in the passage. The second oxygen sensor generates a signal indicative of an oxygen concentration in the exhaust gas which flows past the second oxygen sensor.

The controller also comprises a device for supplying fuel to the engine, and a microprocessor programmed to calculate a difference between the signal output from the second oxygen sensor and a predetermined first slice level, set an updating amount of the air-fuel ratio feedback correction coefficient such that the updating amount has a larger value the larger the difference, update the feedback correction coefficient by the updating amount based on a comparison of the signal output from the first oxygen sensor with a predetermined second slice level, feedback control a fuel supply amount of the file supplying device according to the updated feedback correction coefficient, calculate a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, perform a diagnosis as to whether or riot the catalyst has deteriorated based on the ratio, and modify the first slice level to a different value when the diagnosis is being performed from when the diagnosis is not being performed.

The microprocessor may be programmed to modify the first slice level to a smaller value when the diagnosis is being performed than when the diagnosis is not being performed.

In this case, it is further preferable that the microprocessor is further programmed to modify the fourth slice level to a larger value when the diagnosis is being performed than when it is not being performed.

The microprocessor may also be programmed to modify the first slice level to a larger value when the diagnosis is being performed than when the diagnosis is not being performed.

In this case, it is further preferable that the microprocessor is further programmed to modify the fourth slice level to a smaller value when the diagnosis is being performed than when it is not being performed.

It is also preferable that the air-fuel ratio feedback correction coefficient comprises a proportional part and an integral part, and the updating amount is an updating amount of the proportional part.

In this case, it is further preferable that the microprocessor is further programmed to learn the updating amount and use a learnt updating amount as an initial value of the updating amount when the engine is restarted, while the microprocessor is further programmed to prohibit learning of the updating amount when the diagnosis is being performed.

It is also preferable that the third slice level is set equal to the second slice level.

This invention also provides an air-fuel ratio controller comprising a microprocessor programmed to calculate a difference between the signal output from the second oxygen sensor and a predetermined first slice level, set an updating amount of the air-fuel ratio feedback correction coefficient such that the updating amount has a larger value the larger the difference, update the feedback correction coefficient by the updating amount based on a comparison of the signal output from the first oxygen sensor with a predetermined second slice level, feedback control a fuel supply amount of the fuel supplying device according to the updated feedback correction coefficient, calculate a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, perform a diagnosis as to whether or not the catalyst has deteriorated based on the ratio, and modify the fourth slice level to a larger value when the diagnosis is being performed than when the diagnosis is not being performed.

It is preferable that the air-fuel ratio feedback correction coefficient comprises a proportional part and all integral part, and the updating amount is an updating amount of the proportional part.

In this case it is further preferable that the microprocessor is further programmed to learn the updating amount and use a learnt updating amount as an initial value of the updating amount when the engine is restarted, while the microprocessor is further programmed to prohibit learning of the updating amount when the diagnosis is being performed.

It is also preferable that the third slice level is set equal to the second slice level.

This invention also provides an air-fuel ratio controller for performing feedback control of an air-fuel ratio of an engine based on an air-fuel ratio feedback correction coefficient, this engine discharging exhaust gas via an exhaust passage fitted with an exhaust purifying catalyst.

The controller comprises a first oxygen sensor provided upstream of the catalyst in the passage, this first oxygen sensor generating a signal indicative of an oxygen concentration in the exhaust gas which flows past the first oxygen sensor, a second oxygen sensor provided downstream of the catalyst in the passage, this second oxygen sensor generating a signal indicative of an oxygen concentration in the exhaust gas which flows past the second oxygen sensor, a mechanism for supplying fuel to the engine, a mechanism for calculating a difference between the signal output from the second oxygen sensor and a predetermined first slice level, a mechanism for setting an updating amount of the air-fuel ratio feedback correction coefficient such that the updating amount has a larger value the larger the difference, a mechanism for updating the feedback correction coefficient by the updating amount based on a comparison of the signal output from the first oxygen sensor with a predetermined second slice level, a mechanism for feedback controlling a fuel supply amount of the fuel supplying mechanism according to the updated feedback correction coefficient, a mechanism for calculating a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, a mechanism for performing a diagnosis as to whether or not the catalyst has deteriorated based on the ratio, and a mechanism for modifying the first slice level to a different value when the diagnosis is being performed from when the diagnosis is not being performed.

This invention also provides an air-fuel ratio controller comprising a first oxygen sensor provided upstream of the catalyst in the passage, this first oxygen sensor generating a signal indicative of an oxygen concentration in the exhaust gas which flows past the first oxygen sensor, a second oxygen sensor provided downstream of the catalyst in the passage, this second oxygen sensor generating a signal indicative of an oxygen concentration in the exhaust gas which flows past the second oxygen sensor, a mechanism for supplying fuel to the engine, a mechanism for calculating a difference between the signal output from the second oxygen sensor and a predetermined first slice level, a mechanism for setting an updating amount of the air-fuel ratio feedback correction coefficient such that the updating amount has a larger value the larger the difference, a mechanism for updating the feedback correction coefficient by the updating amount based on a comparison of the signal output from the first oxygen sensor with a predetermined second slice level, a mechanism for feedback controlling a fuel supply amount of the fuel supplying mechanism according to the updated feedback correction coefficient, a mechanism calculating a ratio between a fluctuation frequency with which the spinal output from the first oxygen sensor fluctuates beyond a predetermined third slice level and a fluctuation frequency with which the signal output from tie second oxygen sensor fluctuates beyond a predetermined fourth slice level, a mechanism for performing a diagnosis as to whether or not the catalyst has deteriorated based an the ratio, and a mechanism for modifying the fourth slice level to a larger value when the diagnosis is being performed than when the diagnosis is not being performed.

The details as well as other features and advantages of this invention are set forth in the remainder of the specification and are shown in the accompanying drawings.

BRIEF DESCRIPTION OF THE DRAWINGS

FIGS. 2A–2D are waveform diagrams comparing an air-fuel ratio when an updating amount DPHOS is a variable depending on the output of a downstream air-fuel ratio sensor, and when the updating amount DPHOS is a fixed value.

FIGS. 3A and 3B are diagrams describing the effect of air-fuel ratio on an oscillation frequency ratio HZRATE.

FIGS. 4A and 4B are diagrams describing the effect that a shift of slice level has on the oscillation frequency ratio HZRATE according to the air-fuel ratio controller.

FIG, 6 is a flowchart for describing a process of setting slice level according to the air-fuel ratio controller.

FIG, 7 is a flowchart for describing a process of computing an air-fuel ratio feedback correction coefficient α according to the air-fuel ratio controller.

Figure 7:
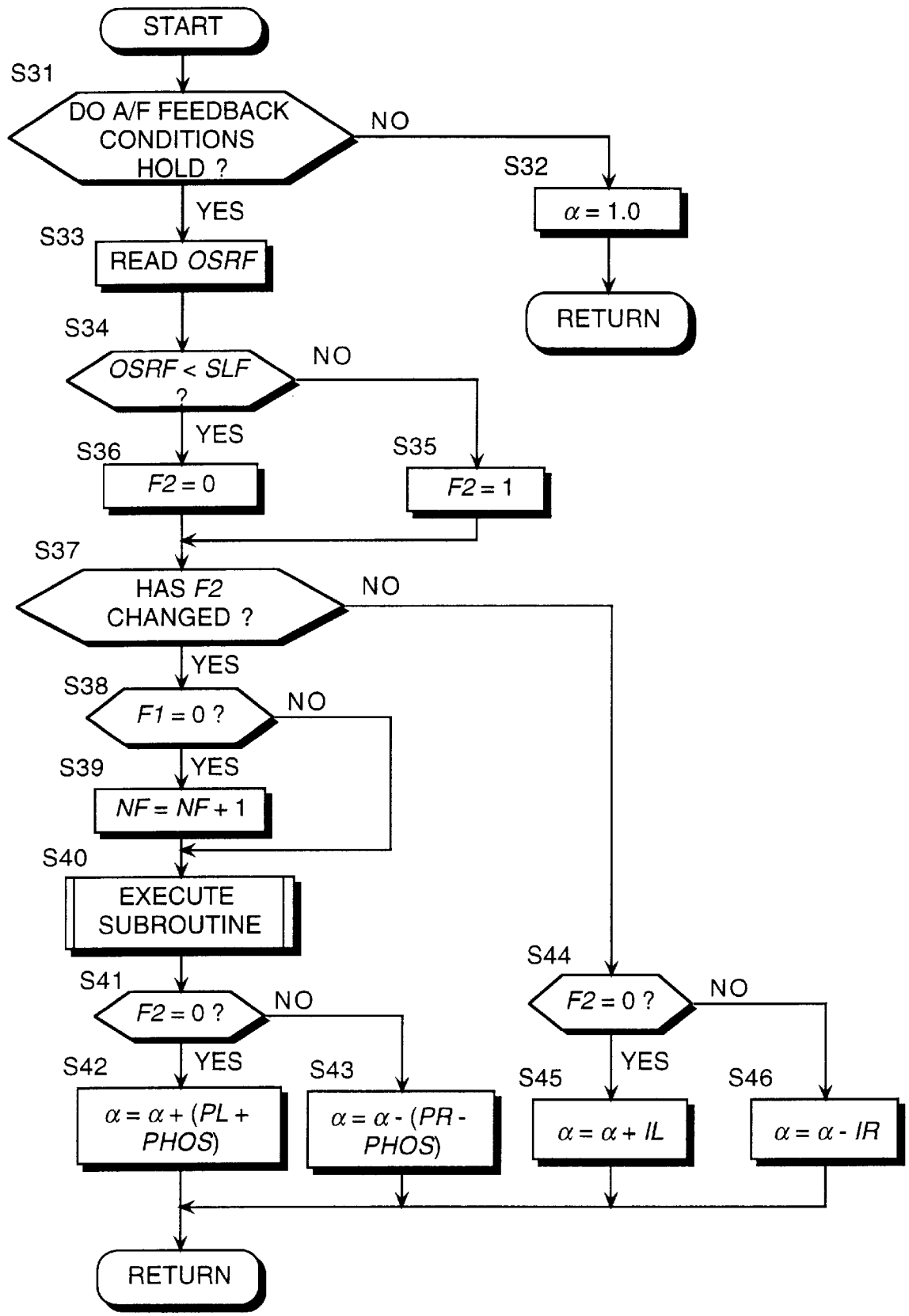
Figure 8A:
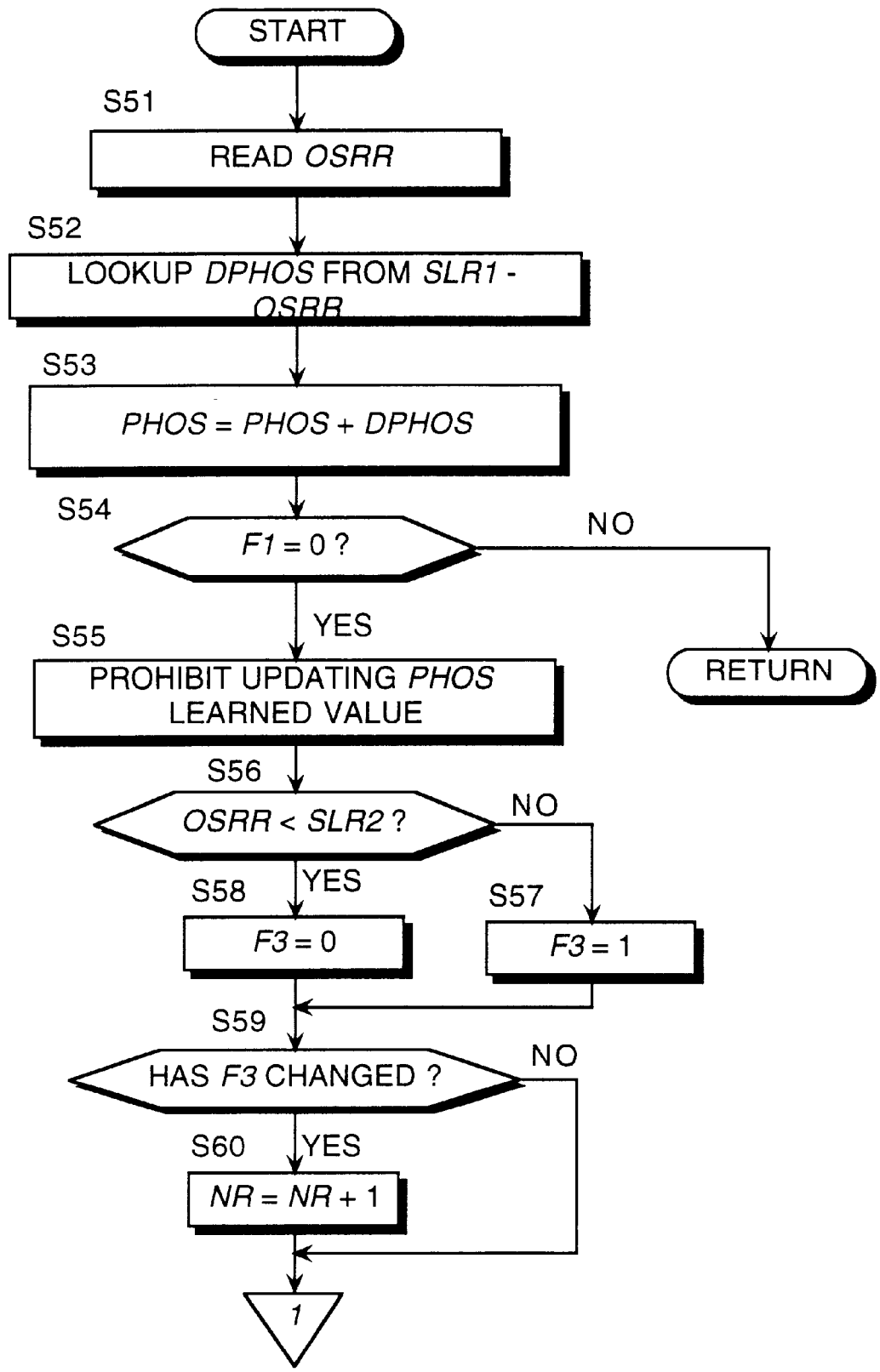
Figure 8B:
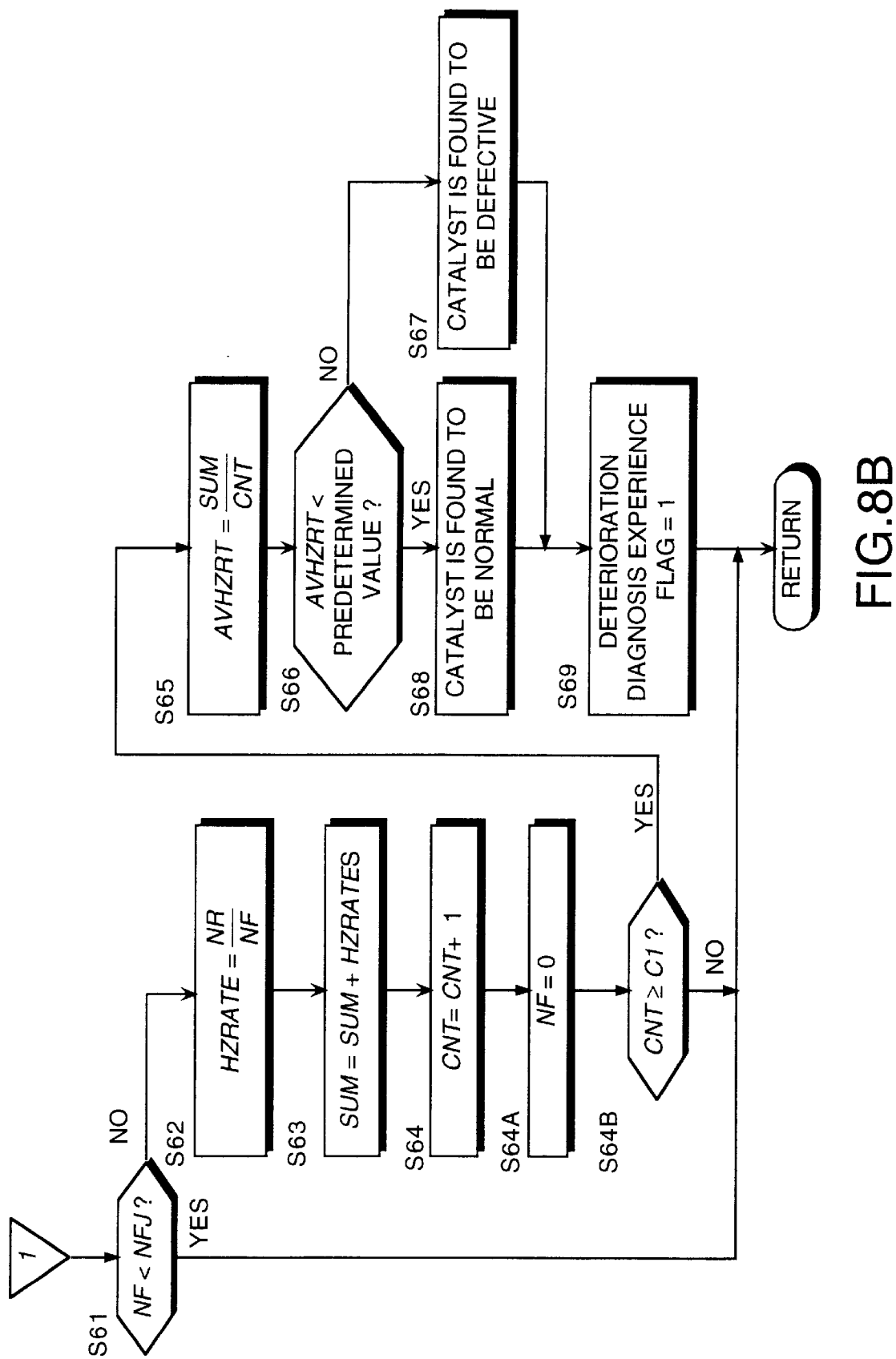

FIGS. 8A and 8B are flowcharts for describing a subroutine in the flowchart of FIG. 7.

Figure 9:
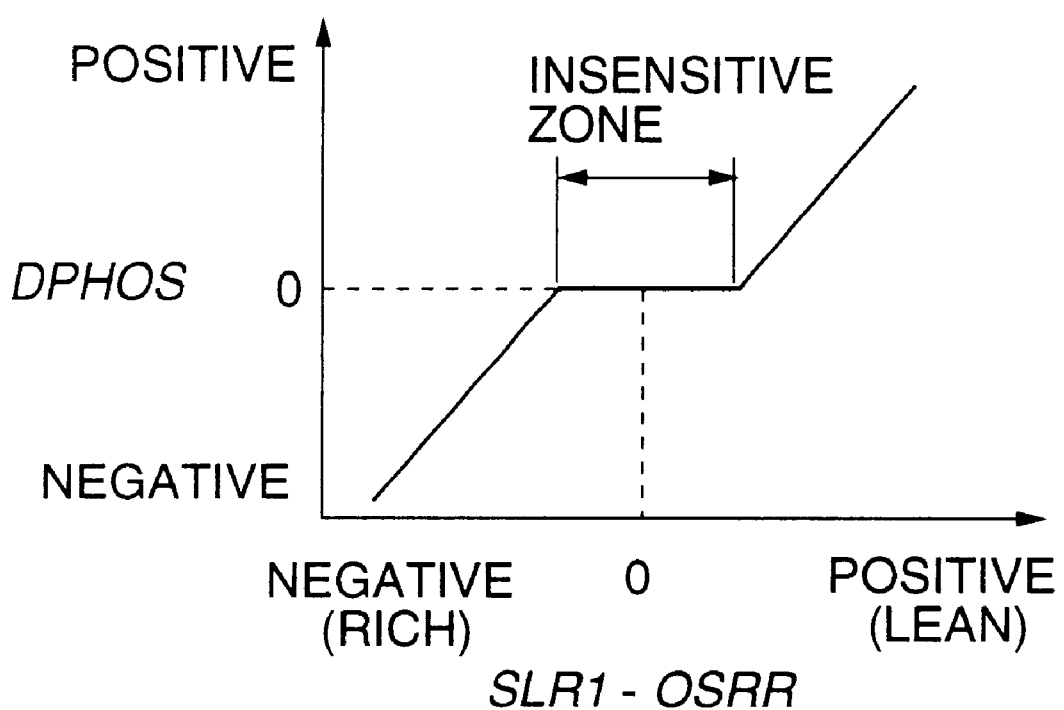

FIG. 9 is a graph showing a relation between an updating amount DPHOS and an output signal OSRR from a downstream $O_2$ sensor, according to the air-fuel ratio controller.

FIGS. 10A–10D are waveform diagrams showing variations of the output signal OSRR from the downstream $O_2$ sensor and a correction value PHOS when a catalyst deterioration diagnosis is performed, and when a catalyst deterioration diagnosis is not performed, according to the air-fuel ratio controller.

Figure 6:
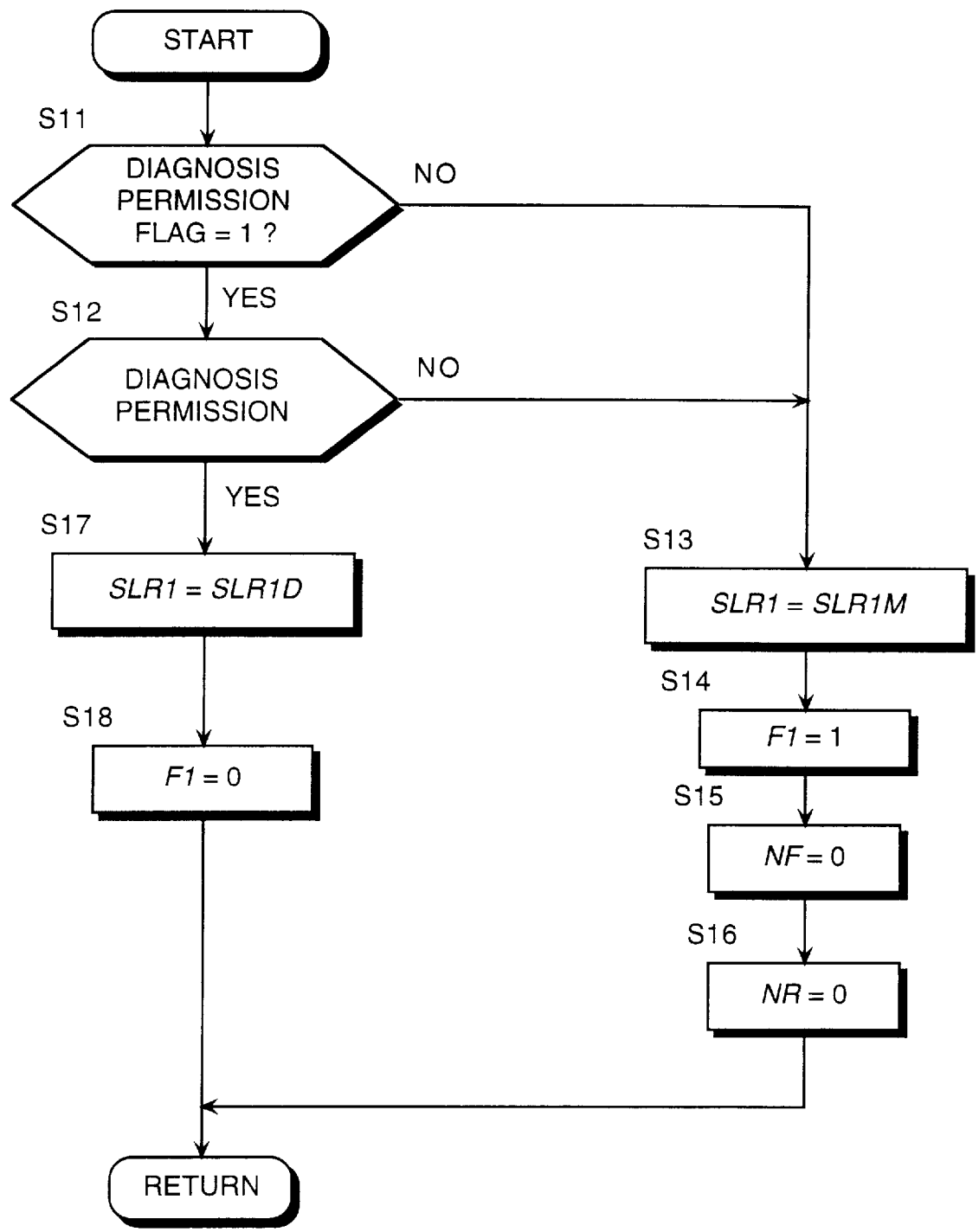
Figure 11:
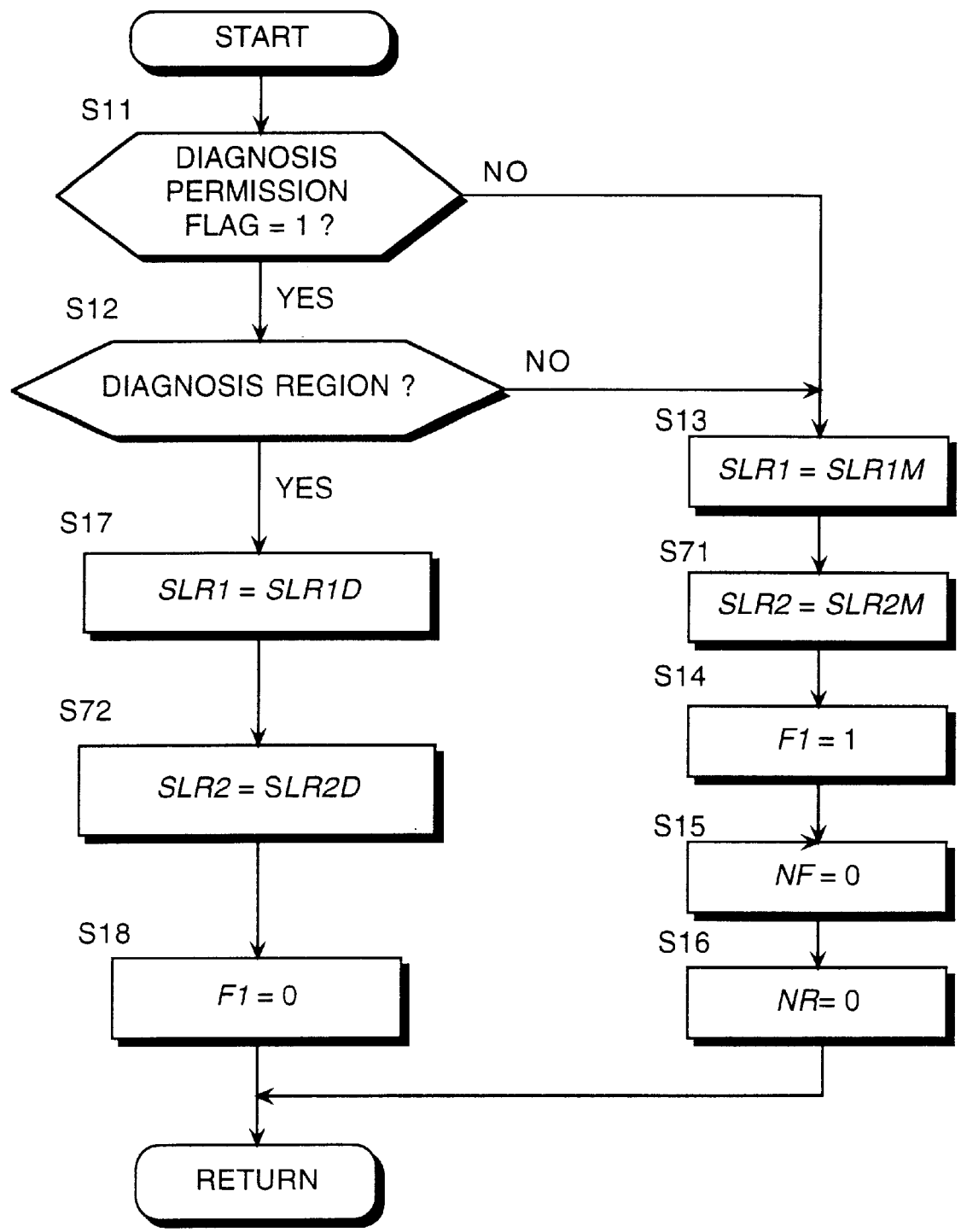

FIG. 11 is similar to FIG. 6, but showing a second embodiment of this invention.

FIGS. 12A–12D are waveform diagrams showing variations of the output signal OSRR from the downstream $O_2$ sensor and a correction value PHOS when a catalyst deterioration diagnosis is performed, and when a catalyst deterioration diagnosis is not performed, according to the second embodiment.

DESCRIPTION OF THE PREFERRED EMBODIMENTS

Figure 1:
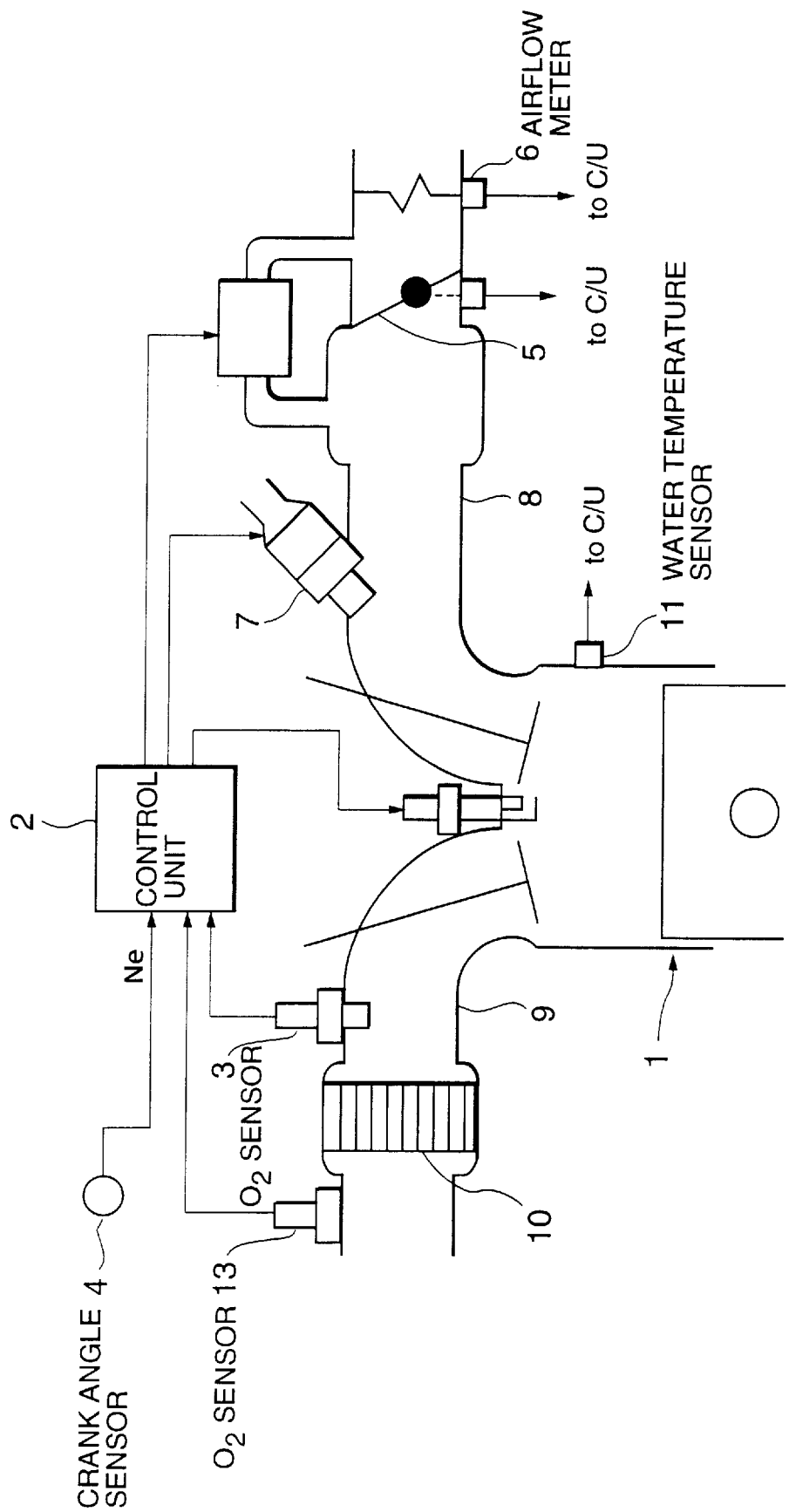
FIG. 1 is a schematic diagram of an air-fuel ratio controller according to this invention.

Referring to FIG. 1 of the drawings, an intake throttle 5 is installed in an intake passage 8 of an automobile engine 1. A fuel injection valve 7 is provided downstream of the throttle 5 of the intake passage 8. The fuel injection valve 7 injects fuel into the intake air in the intake passage 8 according to an injection signal transmitted by a control unit 2. The air-fuel mixture thereby generated is burnt in the engine 1, and exhaust is discharged from a discharge passage 9 via a three-way catalytic converter 10.

$O_2$ sensors 3 and 13 are provided upstream and downstream of the catalytic converter 10 of the discharge passage 9.

A Ref signal or a reference position signal, and a Pos signal or a 1 degree signal, are input from a crank angle sensor 4 to the control unit 2. An intake air amount signal from an air flow meter 6 and an engine cooling water temperature signal from a water temperature sensor 11 are also input. Based on these signals, the control unit 2 computes a basic injection pulse width Tp of the fuel injection valve 7, adds various corrections to compute injection pulse width Ti of the fuel injection valve 7, and outputs a corresponding fuel injection signal to the fuel injection valve 7.

Air-fuel ratio feedback control is then performed by applying the air-fuel ratio feedback coefficient α based on the signal output by the upstream $O_2$ sensor 3 in this calculation process.

The control unit 2 also diagnoses whether or not a catalyst in the catalytic converter 10 has deteriorated by comparing the output signals from the $O_2$ sensors 3, 13.

During the air-fuel ratio feedback control, the output signal from the upstream $O_2$ sensor 3 periodically fluctuates between rich and lean. Downstream of the catalytic converter 10, the variation of remaining $O_2$ concentration is gradual due to the storage capacity of the catalyst 10, so the output signal from the downstream $O_2$ sensor 13 is longer than that from the upstream $O_2$ sensor 3 and it has a narrower fluctuation amplitude.

However, when the catalyst deteriorates, there is no longer such a great difference in the $O_2$ concentrations upstream and downstream of the catalyst 10, and as a result, the output signal from the downstream $O_2$ sensor 13 fluctuates between rich and lean with a period approaching that of the output signal from the upstream $O_2$ sensor 3.

Therefore, although a ratio HZRATE of oscillation frequencies NR and NF of the signals output from the downstream and upstream sensors 13, 3 is near to 0 when the catalyst is new the ratio approaches 1 as deterioration of the catalyst progresses. The control unit 2 determines that the catalyst in the catalytic converter 10 has deteriorated when the average value AVHZRT of HZRATE in a fixed interval is equal to or greater than a predetermined value, e.g. 0.5.

The control unit 2 also corrects proportional amounts PR,PL of a feedback control coefficient used for air-fuel ratio feedback control based on the output signal from the downstream sensor 13. The control unit 2 corrects PR and PL by a correction value PHOS. The control unit also updates the correction value PHOS by an updating amount DPHOS which is determined based on the deviation of the signal output from the downstream $O_2$ sensor 13 from a predetermined slice level. In this case the slice level corresponds to the stoichiometric air-fuel ratio.

As shown in FIG. 9, the control unit 2 increases the absolute value of the updating amount DPHOS as an output signal OSRR from the downstream $O_2$ sensor 13 departs from a slice level SLR1, and when the signal OSRR is near the slice level SLR1, the absolute value of the updating amount DPHOS is reduced.

FIGS. 2C and 2D show waveforms of the air-fuel ratio at upstream and down stream of the catalytic converter 10 when the updating amount DPHOS is varied according to the above method. FIGS. 2A and 2B show waveforms of the air-fuel ratio at upstream and downstream of the catalytic converter 10 when the updating amount DPHOS is a fixed value.

As seen from these figures, when the updating amount DPHOS is varied according to the deviation of the signal from the downstream sensor 13 from the slice level SLR1, the fluctuation amplitude of the air-fuel ratio as a whole becomes smaller than in the case where the updating amount DPHOS is fixed. However, when the fluctuation period of the air-fuel ratio around the stoichiometric air-fuel ratio becomes smaller, the frequency NR of the signal increases, the fluctuation frequency ratio HZRATE=NR/NF becomes large, and as a result, it may erroneously be diagnosed that the catalyst has deteriorated.

The control unit 2 therefore shifts the slice level SLR1 to lean when deterioration diagnosis of the catalyst is performed compared to the situation when diagnosis is not performed.

In this way, the fluctuation frequency ratio HZRATE of the output signal of the downstream $O_2$ sensor 13 to the output signal of the upstream $O_2$ sensor 3 is forcibly reduced, and erroneous diagnosis of catalyst deterioration does not occur.

Next, the control performed by the control unit 2 will be described with reference to flowcharts.

Figure 5:
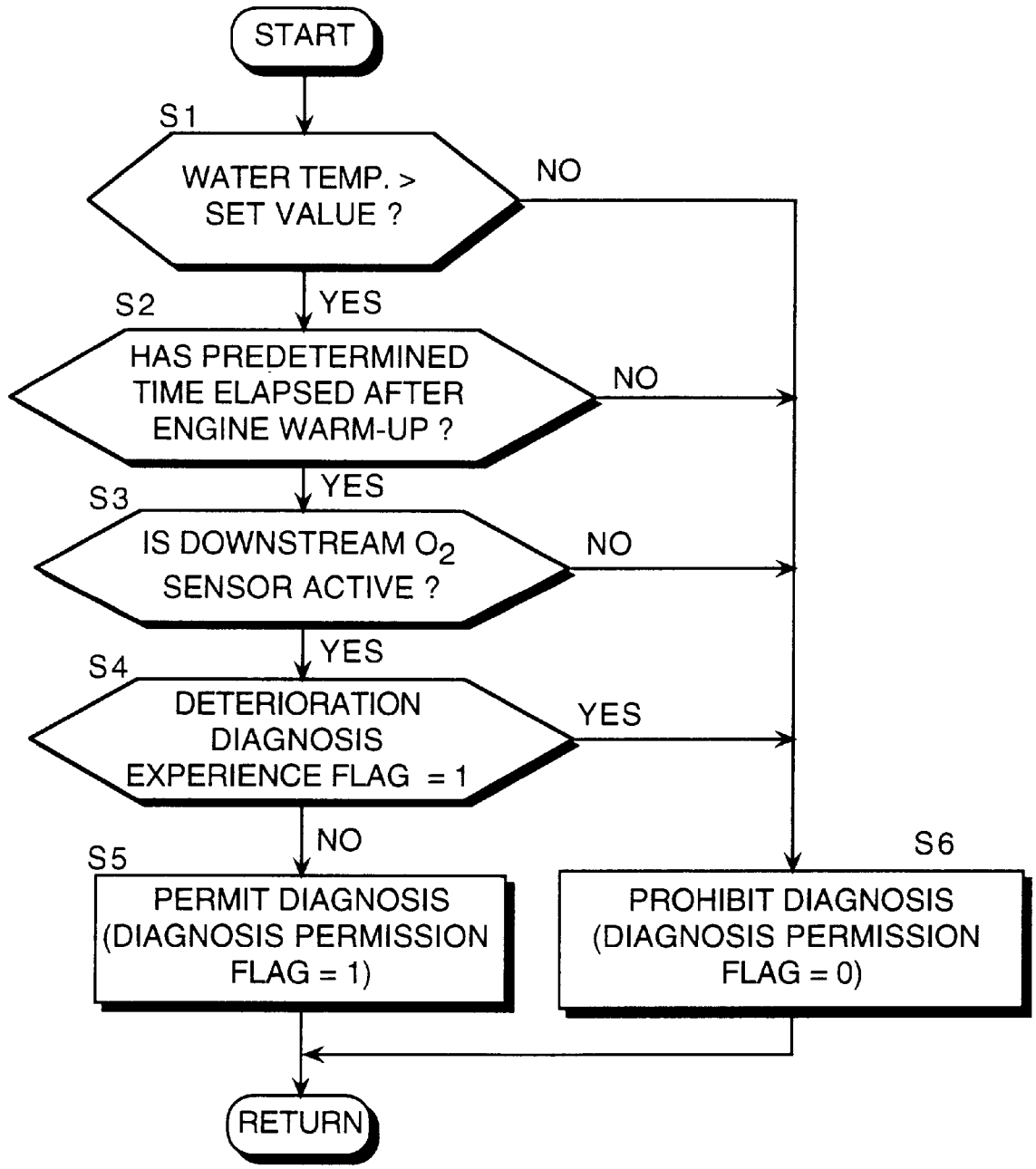
FIG. 5 is a flowchart for describing a determining process of catalyst deterioration diagnosis conditions according to the air fuel ratio controller.

The flowchart of FIG. 5 shows a process for determining catalyst deterioration diagnosis conditions. This process is executed at a fixed interval e.g., ten milliseconds.

In steps S1–S4, it is determined whether or not the following conditions hold.

S1: Water temperature is equal to or greater than a predetermined value.

S2: A predetermined time has elapsed from completion of engine warmup.

S3: The downstream $O_2$ sensor 13 is activated this is determined from the output signal level of the downstream $O_2$ sensor).

S4: deterioration diagnosis experience flag is not 1 (this flag is initialized to "0" on engine startup).

When all the above conditions are satisfied, a diagnosis permission flag is set to 1 in a step S5, and when any of the above conditions is not satisfied, the diagnosis permission flag is set to "0" in a step S6.

The flowchart of FIG. 6 shows the process of setting the slice level. This process is executed as a background job separate from the process of FIG. 5.

In steps S11, S12, the following conditions are determined.

S11: diagnosis permission flag is 1.

S12: engine is in deterioration diagnosis region.

In the deterioration diagnosis region the following two conditions are satisfied.

i) Air-fuel ratio feedback control conditions are satisfied based on the output signal from the upstream $O_2$ sensor 3.

ii) Vehicle running conditions are always in a steady state, i.e. vehicle speed, engine rotation speed and a basic injection pulse width Tp are all within a predetermined range.

When either of the conditions S11, S12 is not satisfied, the slice level SLR1 is set to a fixed value SLR1M in a step S13. Under rich conditions, the output of the $O_2$ sensor is effectively 1000 mV and under lean conditions, it is effectively 0 mV. SLR1M is for example set so that the output signal voltage of the $O_2$ sensor is at a center value of 500 mV.

In the next step S14, a fag F1 is set to "1".

The flag F1 is a flag showing whether or not the catalyst deterioration diagnosis is being performed.

F1=0 shows that deterioration diagnosis is being performed, and F=1 shows that deterioration diagnosis is not being performed.

In steps S15, S16, counters NF, NR are respectively set to 0.

These counters NF, NR are provided in order to measure the frequency with which the output signal OSRF of the upstream $O_2$ sensor anD the frequency with which the output signal OSRR of the downstream $O_2$ sensor 13 oscillate after starting deterioration diagnosis of the catalyst. Accordingly, they are reset to 0 when deterioration diagnosis is not being performed.

On the other hand, when the conditions of both the steps S11, S12 are satisfied, in a step S17, a slice level SLR1 is set to a value SLR1D which is less than the fixed value SLR1M.

In a step S18, the flag F1 is set to "0" showing that deterioration diagnosis is being performed.

The flowchart of FIG. 7 shows the process of computing the air-fuel ratio feedback correction coefficient α. This process is performed in synchronism with the Ref signal independently from the processes of FIGS. 5 and 6.

In a step S31, it is determined whether or not air-fuel ratio feedback control conditions hold.

Herein, air-fuel ratio feedback control conditions exclude the conditions such as engine startup, low water temperature, an occasion when an abnormality has been detected in the upstream $O_2$ sensor, or an occasion when the oscillation cycle of the signal from the upstream $O_2$ a sensor is larger than a predetermined value.

When the air-fuel ratio feedback control conditions are not satisfied, the air-fuel ratio feedback correction coefficient α is fixed to 1.0 in a step S32, and the process is terminated.

When the air-fuel ratio feedback control condition holds, the output signal OSRF of the upstream $O_2$ sensor 3 is read in a step S33, and OSRF is compared with a slice level SLF in a step S34, SLF is set to, for example, 500 mV. When OSRF≧SLF, it is determined that the air-fuel ratio is rich, and the flag F2 is set to "1" in a step S35. When OSRF<SLF, it is determined that the air-fuel ratio is lean, and 0 is inserted in the flag F2 in a step S36.

In a following step S37, it is determined whether or not the value of the flag F2 has charged from the immediately preceding occasion. When it has changed, the routine proceeds to a step S38, and when the value of the flag F2 has not changed, the routine proceeds to a step S44.

The step S38, and steps S39 and S40, are steps for performing the deterioration diagnosis of the catalyst. First, in the step S38, the value of the flag F1 is determined, and when F1=0 showing that deterioration diagnosis is being performed, the counter NF is incremented in the step S39. This counter NF shows the number of times the output signal OSRF of the upstream $O_2$ sensor crosses the slice level SLF after starting deterioration diagnosis of the catalyst. In other words, the counter NF shows the number of times the output signal OSRF exceeds the slice level and changes from rich to lean or from lean to rich.

In a step S40, the subroutine shown in FIGS. 8A and 8B is executed. As a result of the determination in the step S37, this subroutine is executed each time the output signal OSRF of the upstream $O_2$ sensor 3 crosses the slice level SLF.

In a step S51, tie output signal OSRR of the downstream $O_2$ sensor 13 is read.

In a step S52, a table shown in FIG. 9 is looked up front the difference between the output signal OSRR of the downstream $O_2$ sensor and the slice level SLR1 of downstream, and an updating amount DPHOS of PHOS on each time is found.

In a step S53, a proportional correction value PHOS is updated by the following expression (1).

$$PHOS = PHOS + DPHOS \qquad (1)$$

As shown in FIG. 9, when the output signal OSRR of the downstream $O_2$ sensor 13 is deviating from the slice level SLR1, the absolute value of DPHOS increases, and when the output signal OSRR of the downstream $O_2$ sensor 13 is approaching the slice level SLR1, the absolute value of DPHOS decreases. In the vicinity of SLR1-OSRR=0, an insensitive region is provided.

In a step S54, it is determined whether or not the flag F1=0, and when F1=0, i.e. when deterioration diagnosis is not being performed, the routine is terminated.

When F=0, i.e. when deterioration diagnosis is being performed, learning of the proportional correction value PHOS is prohibited in a step S55.

The control unit 2 learns the value of PHOS, i.e., stores and updates the value of PHOS in a backup RAM, every time the calculation in the step S53 is performed in order to use the learnt value a an initial value of PHOS on the occasion when the engine is restarted.

However, according to this invention, the slice level SLR1 is reduced during deterioration diagnosis of the catalyst, and as a result the value of PHOS calculated in the step S53 is much different from the value calculated when the deterioration diagnosis of the catalyst is not performed.

In this state, it is not appropriate to learn the proportional correction value PHOS, so updating of the learning value of PHOS is prohibited during deterioration diagnosis of the catalyst.

Steps S56–S60 show a process for measuring the number of times the output signal of the downstream $O_2$ sensor 13 oscillates after starting deterioration diagnosis of the catalyst. This process is similar to that performed in the steps S34–S39 of FIG. 7.

First, in a step S56, the output signal OSRR of the downstream $O_2$ sensor 13 is compared with a slice level SLR2. When OSRR≧SLR2, i.e. when the air-fuel ratio is rich, "1" is entered in a flag F3 in a step S57, and when OSRR<SLR2, i.e. when the air-fuel ratio is lean, "0" is entered in the flag F3 in a step S58.

The slice level SLR2 may be set to, e.g., 500 mV.

In a step S59, it is determined whether or not the value of the flag F3 has changed from the immediately preceding occasion. When it has changed, the counter NR is incremented in a step S60 and the routine proceeds to a step S61. When the value of the flag F3 has not changed, the step S60 is skipped and the routine proceeds to the step S61. The counter NR shows the number of times the output signal OSRR from the downstream $O_2$ sensor 13 oscillates after starting deterioration diagnosis of the catalyst in the catalytic converter 10.

In steps S61–S68, it is determined whether or not the catalyst has deteriorated.

First, in the step S61, the counter NF is compared with a predetermined value NFJ. The counter NF is the number of times tire output signal OSRF of the upstream $O_2$ sensor crosses the slice level SLF after starting deterioration diagnosis of the catalyst. When this process proceeds to the step S61 for the first time after engine startup, NF<NFJ, so the routine is immediately terminated without proceeding to any further steps. When on the other hand the counter NF reaches the predetermined value NFJ, the routine proceeds to a step S62. Herein, the fluctuation frequency ratio HZRATE is found from the following equation (2).

$$HZRATE=NR/NF \quad (2)$$

In the step S63, the fluctuation frequency ratio HZRATE is added to a storage value SUM of the memory, and the result is stored as a new storage value SUM. The storage value SUM is initialized to "0" on startup.

In a step S64, the counter CNT is incremented. In a step S64A, the counter NF is reset to "0".

In a step S64B, a counter CNT representing a number of accumulations of the fluctuation frequency ratio HZRATE is compared with a predetermined value C1. The counter CNT is initiated to "0" on engine startup. When this routine proceeds to the step S64B for the first time after engine startup. CNT<C1, so the routine is immediately terminated, and when eventually CNT≧C1, the routine proceeds to a step S65. In the step S65, the average AVHZRT of HZRATE for a fixed interval is calculated by the next expression (3).

$$AVHZRT=SUM/CNT \quad (3)$$

In the step S66, the average AVHZRT is compared with a predetermined value. When the catalyst of the catalytic converter 10 deteriorates, the number of oscillations of the output signal of the downstream $O_2$ sensor 13 approaches the number of oscillations of the of output signal of the upstream $O_2$ sensor 3, and AVHZRT increases. Accordingly, when AVHZRT is equal to or greater than a predetermined value, it is determined in the step S67 that deterioration has occurred in the catalyst of the catalytic converter 10.

When AVHZRT is less than the predetermined value, it is determined in the step S68 that deterioration has not occurred in the catalyst.

The determination result is stored in a backup RAM.

In a step S69, the deterioration diagnosis experience flag is set to "1" and the process is terminated. The deterioration diagnosis experience flag is initialized to "0" on engine startup. By setting the deterioration diagnosis experience flag to "1", when the process for determining deterioration diagnosis conditions of FIG. 5 is executed on the next occasion, the routine proceeds from the step S4 to the step S6 and deterioration diagnosis of the catalyst is prohibited. It other words, after performing the deterioration diagnosis of the catalyst in the steps S67 and S68 of FIG. 8B, second and subsequent catalyst deterioration diagnoses are not performed until the engine is restarted.

After execution of the above subroutines is complete, the routine returns to a step S41 of of FIG. 7, and determination of the flag F2 is performed.

When F2=0, it shows that the air-fuel ratio has changed from rich to lean.

In this case, the value of the feedback correction coefficient α is updated by the following expression (4) in a step S42.

$$\alpha=\alpha+(PL+PHOS) \quad (4)$$

When F2=1, it shows that the air-fuel ratio has changed from lean to rich. In this case, the value of the feedback correction coefficient α is updated by the following expression (5) in a step S43.

$$\alpha=\alpha-(PR-PHOS) \quad (5)$$

On the other hand, when it is determined in the step S37 that the output signal of the upstream $O_2$ sensor 3 has not changed from the immediately preceding occasion determination of the flag F2 is performed in the step S44. When F2=0, it shows that the air-fuel ratio is still lean. In this case, an integral part IL is added to the feedback correction coefficient α in a step S45.

When F2=1, it shows that the air-fuel ratio is still rich. In this case, an integral part IR is subtracted from the feedback correction coefficient α in a step S46.

Using the air-fuel ratio feedback correction coefficient which was computed in this way, the fuel injection pulse width supplied to the injector 4 is calculated by the following equation (6). The process used to calculate the fuel injection pulse width Ti is known in the art, and its description is therefore omitted.

$$Ti=Tp \cdot Co \cdot \alpha \cdot \alpha_m \cdot 2 + Ts \quad (6)$$

where:

Tp=basic injection pulse width

Co=SUM of 1 and correction coefficients $\alpha_m$=air-fuel ratio layering correction coefficient Ts=ineffectual pulse width The calculated value of the fuel injection pulse width Ti is transferred to an output register according to the injection timing of the fuel injection valve 7, and a fuel amount corresponding to the fuel injection pulse width Ti is injected into each cylinder of the engine 1 every time the engine performs two rotations.

Figure 10C:
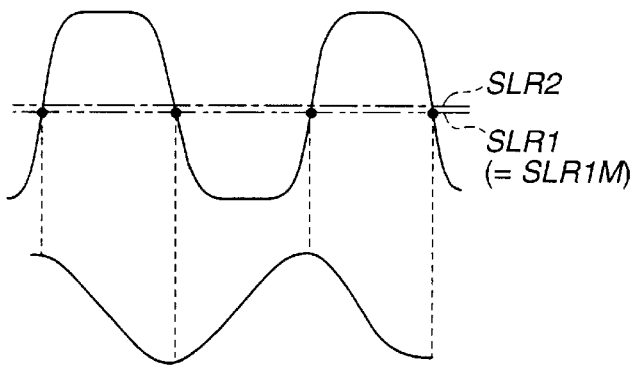
Figure 10D:
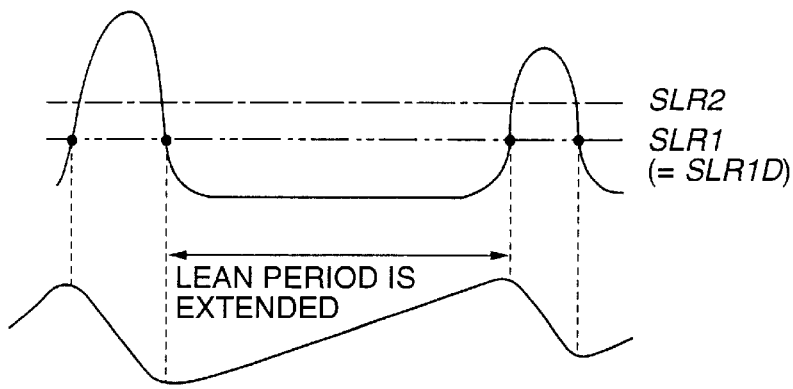

The output signal OSRR from the downstream $O_2$ sensor 13 and the variation of the correction value PHOS of the proportional part of the air-fuel ratio feedback control coefficient α under the control described hereabove, are shown in FIGS. 10A–10D. FIGS. 10A, 10B show the change when catalyst deterioration diagnosis is not being performed, and FIGS. 10C, 10D show the change when catalyst deterioration diagnosis is being performed.

When catalyst deterioration diagnosis is not being performed, the slice level SLR1 is in the vicinity of a predetermined value SLR1M. In this state, a difference between the output signal OSRR from the downstream $O_2$ sensor and the slice level SLR1 in the rich interval is almost the same as a difference between the output signal OSRR and slice level SLR1 in the lean interval, and the slope of the correction value PHOS is also effectively the same in the rich and lean intervals. The air-fuel ratio is consequently kept in the vicinity of the theoretical air-fuel ratio as shown in FIG. 2B.

When the slice level SLR1 becomes a value SLR1D smaller than the above SLR1M when catalyst deterioration diagnosis is being performed as shown in FIG. 10C, the difference between the output signal OSRR from the downstream $O_2$ sensor 13 and the slice level SLR1 increases in the rich interval, and as a result, the updating amount DPHOS of the correction value on each occasion increases. Conversely in the lean interval, the difference between the output signal OSRR from the downstream $O_2$ sensor and the slice level SLR1 decreases. As a result, the updating amount DPHOS of the correction value PHOS decreases on each occasion.

Therefore, the slope of PHOS is steep in the rich interval and gradual in the lean interval, and the lean becomes longer than the rich interval. In other words, by reducing the slice level SLR1, the air-fuel ratio when catalyst deterioration diagnosis is being performed is forcibly shifted to lean.

This means that whereas the air-fuel ratio was centered on a point A in FIG. 4A, i.e. the stoichiometric air-fuel ratio, before shift, it is centered on another point B in the figure after shift.

The average value of HZRATE, i.e., AVHZRT, in a fixed interval centered on point A may exceed the predetermined value due to scatter in HZRATE, as shown in FIGS. 3B and 4B, and as a result, there is a possibility that it will be erroneously diagnosed that the catalyst has deteriorated. However, when the air-fuel ratio moves so that it is centered on the point B as shown in FIG. 4A, AVHZRT does not exceed the predetermined value even when there is maximum scatter in HZRATE as shown in FIG. 4B, and consequently, catalyst deterioration is not erroneously diagnosed.

In this embodiment the slice level SLR1 is set to be smaller when the diagnosis of the catalytic converter 10 is being performed form when the diagnosis is not being performed. However, it should be understood from FIGS. 3A–4B, that the same effect is obtained when the slice level SLR1 is set to be larger when the diagnosis is being performed than when it is not being performed. In this case, the point on which the air-fuel ratio is centered is shifted towards rich from the point A, and AVHZRT does not exceed the predetermined value even when there is maximum scatter in HZRATE as in the case when the air-fuel ratio is centered on the point B.

FIGS. 11, 12A–12D show a second embodiment of this invention.

A flowchart of FIG. 11 is equivalent to the flowchart of FIG. 6 of the aforesaid first embodiment.

According to the first embodiment, the slice level SLR2 for determining inversion of the output signal of the downstream side $O_2$ sensor 13 was fixed, and the slice level SLR1 used for calculating the updating amount DPHOS was varied depending on whether or not catalyst deterioration was being diagnosed.

According to the second embodiment, the slice level SLR2 is also modified depending on whether or not catalyst deterioration is being diagnosed.

For this purpose, steps S71, S72 are provided in the flowchart of FIG. 11.

When deterioration diagnosis of the catalyst is not being performed, the slice level SLR2 is set to a fixed value SLR2M in the step S71. The fixed value SLR2M may for example be 500 mV. When deterioration diagnosis of the catalyst is being performed, the slice level SLR2 is set to a predetermined value SLR2D which is larger than SLR2M in the step S72.

Figure 12C:
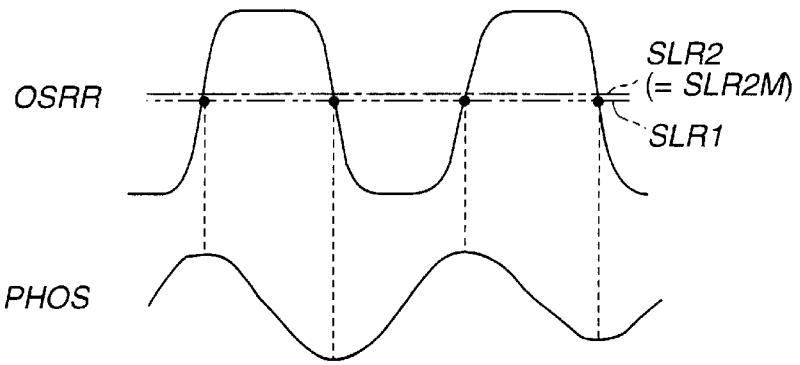
Figure 12D:
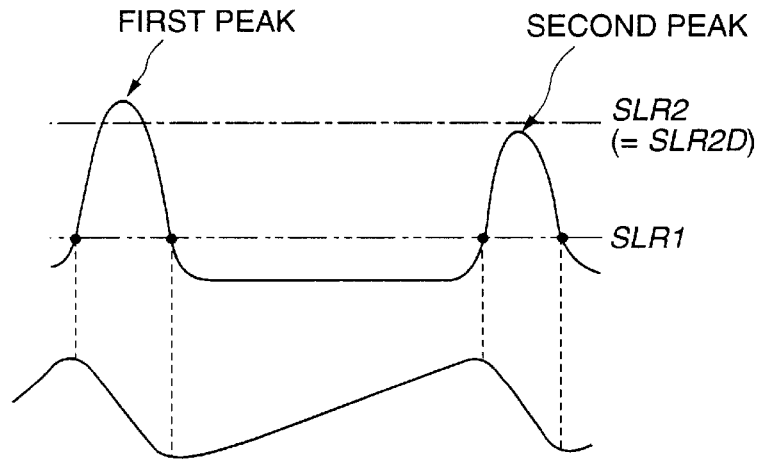

Depending on the characteristics of the $O_2$ sensor, when the air-fuel ratio is rich, the peak output signal from the downstream $O_2$ sensor 13 may be a little less than 1000 mV. In FIG. 12C, for example, a first peak is in the vicinity of 1000 mV and exceeds the value SLR2D which is set to be larger than a second peak.

When the $O_2$ sensor has such a characteristic, by setting the slice level SLR2 to be larger than the second peak where catalyst deterioration is being performed, the number NR of inversions of the output signal OSRR of the downstream $O_2$ sensor 13 may be reduced compared to the case of the first embodiment. Hence by making AVHZRT even smaller than in the first embodiment, the possibility of making an erroneous diagnosis is even less than in the first embodiment.

It is moreover possible to set the slice level SLR1D when catalyst deterioration is being performed larger than the slice level SLR1M when catalyst deterioration is not being performed, and also to set the slice level SLR2D when catalyst deterioration is being performed larger than the slice level SLR2M when catalyst deterioration is not being performed.

According to the aforesaid first and second embodiments, determination of catalyst deterioration was performed by comparing the average value AVHZRT of the fluctuation frequency ratio HZRATE in a fixed interval with a predetermined value, however it will be understood that determination of catalyst deterioration may be performed also by comparing HZRATE itself with a predetermined value.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. An air-fuel ratio controller for performing feedback control of an air-fuel ratio of an engine based on an air-fuel ratio feedback correction coefficient, said engine discharging exhaust gas via an exhaust passage fitted with an exhaust purifying catalyst, comprising:

a first oxygen sensor provided upstream of said catalyst in said passage, said first oxygen sensor generating a signal indicative of an oxygen concentration in the exhaust gas which flows past said first oxygen sensor, a second oxygen sensor provided downstream of said catalyst in said passage, said second oxygen sensor generating a signal indicative of an oxygen concentration in the exhaust gas which flows past said second oxygen sensor, a device for supplying fuel to said engine, and a microprocessor programmed to:
calculate a difference between the signal output from the second oxygen sensor and a predetermined first slice level, set an updating amount of said air-fuel ratio feedback correction coefficient such that said updating amount has a larger value the larger said difference, update said feedback correction coefficient by said updating amount based on a comparison of the signal output from the fist oxygen sensor with a predetermined second slice level, feedback control a fuel supply amount of said fuel supplying device according to said updated feedback correction coefficient, calculate a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, perform a diagnosis as to whether or not said catalyst has deteriorated based on said ratio, and modify said first slice level to a different value when said diagnosis is being performed from when said diagnosis is not being performed.

2. An air-fuel ratio controller as defined in claim 1, wherein said microprocessor is programmed to modify said first slice level to a smaller value when said diagnosis is being performed than when said diagnosis is not being performed.

3. An air-fuel ratio controller as defined in claim 1, wherein said microprocessor is programmed to modify said first slice level to a larger value when said diagnosis is being performed than when said diagnosis is not being performed.

4. An air-fuel ratio controller as defined in claim 2, wherein said microprocessor is further programmed to modify said fourth slice level to a larger value when said diagnosis is being performed than when said diagnosis is not being performed.

5. An air-fuel ratio controller as defined in claim 3, wherein said microprocessor is further programmed to mode said fourth slice level to a smaller value when said diagnosis is being performed than when said diagnosis is not being performed.

6. An air-fuel ratio controller as defined in claim 1, wherein said air-fuel ratio feedback correction coefficient comprises a proportional part and an integral part, and said updating amount is an updating amount of the proportional part.

7. An air-fuel ratio controller as defined in claim 6, wherein said microprocessor is further programmed to learn said updating amount and use a learnt updating amount as an initial value of said updating amount when the engine is restarted, while said microprocessor is further programmed to prohibit learning of said updating amount when said diagnosis is being performed.

8. An air-fuel ratio controller as defined in claim 1, wherein said third slice level is set equal to said second slice level.

9. An air-fuel ratio controller for performing feedback control of an air-fuel ratio of an engine based on an air-fuel ratio feedback correction coefficient, said engine discharging exhaust gas via an exhaust passage fitted with an exhaust purifying catalyst, comprising:

a first oxygen sensor provided upstream of said catalyst in said passage, said first oxygen sensor generating a signal indicative of an oxygen concentration in the exhaust gas which flows past said first oxygen sensor, a second oxygen sensor provided downstream of said catalyst in said passage, said second oxygen sensor generating a signal indicative of an oxygen concentration in the exhaust gas which flows past said second oxygen sensor, a device for supplying fuel to said engine, and a microprocessor programmed to:

calculate a difference between the signal output from the second oxygen sensor and a predetermined first slice level, set an updating amount of said air-fuel ratio feedback correction coefficient such that said updating amount has a larger value the larger said difference, update said feedback correction coefficient by said updating amount based on a comparison of the signal output from the first oxygen sensor with a predetermined second slice level, feedback control a fuel supply amount of said fuel supplying device according to said updated feedback correction coefficient, calculate a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, perform a diagnosis as to whether or not said catalyst has deteriorated based on said ratio, and modify said fourth slice level to a larger value when said diagnosis is being performed than when said diagnosis is not being performed.

10. An air-fuel ratio controller as defined in claim 9, wherein said air-fuel ratio feedback correction coefficient comprises a proportional part and an integral part, and said updating amount is an updating amount of the proportional part.

11. An air-fuel ratio controller as defined in claim 10, wherein said microprocessor is further programmed to learn said updating amount and use a learnt updating amount as an initial value of said updating amount when the engine is restarted, while said microprocessor is further programmed to prohibit learning of said updating amount when said diagnosis is being performed.

12. An air-fuel ratio controller as defined in claim 9, wherein said third slice level is set equal to sad second slice level.

13. An air-fuel ratio controller for performing feedback control of an air-fuel ratio of an engine based on an air-fuel ratio feedback correction coefficient, said engine discharging exhaust gas via an exhaust passage fitted with an exhaust purifying catalyst, comprising;

a first oxygen sensor provided upstream of said catalyst in said passage, said first oxygen sensor generating a signal indicative of an oxygen concentration in the exhaust gas which flows past said first oxygen sensor, a second oxygen sensor provided downstream of said catalyst in said passage, said second oxygen sensor generating a signal indicative of an oxygen concentration in the exhaust gas which flows past said second oxygen sensor, means for supplying fuel to said engine, means for calculating a difference between the signal output from the second oxygen sensor and a predetermined first slice level, means for setting an updating amount of said air-fuel ratio feedback correction coefficient such that said updating amount has a larger value the larger said difference, means for updating said feedback correction coefficient by said updating amount based on a comparison of the signal output from the first oxygen sensor with a predetermined second slice level, means for feedback controlling a fuel supply amount of said fuel supplying means according to said updated feedback correction coefficient, means for calculating a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, means for performing a diagnosis as to whether or not said catalyst has deteriorated based on said ratio, and means for molding said first slice level to a different value when said diagnosis is being performed from when said diagnosis is not being performed.

14. An air-fuel ratio controller for performing feedback control of an air-fuel ratio of an engine based on an air-fuel ratio feedback correction coefficient, said engine discharging exhaust gas via an exhaust passage fitted with an exhaust purifying catalyst, comprising:

a first oxygen sensor provided upstream of said catalyst in said passage, said first oxygen sensor generating a signal indicative of an oxygen concentration in the exhaust gas which flows past said first oxygen sensor, a second oxygen sensor provided downstream of said catalyst in said passage, said second oxygen sensor generating a signal indicative of an oxygen concentration in the exhaust gas which flows past said second oxygen sensor, means for supplying fuel to said engine, means for calculating a difference between the signal output from the second oxygen sensor and a predetermined first slice level, means for setting an updating amount of said air-fuel ratio feedback correction coefficient such that said updating amount has a larger value the larger said difference, means for updating said feedback correction coefficient by said updating amount based on a comparison of the signal output from the first oxygen sensor with a predetermined second slice level, means for feedback controlling a fuel supply amount of said fuel supplying means according to said updated feedback correction coefficient, means for calculating a ratio between a fluctuation frequency with which the signal output from the first oxygen sensor fluctuates beyond a predetermined third slice level and a fluctuation frequency with which the signal output from the second oxygen sensor fluctuates beyond a predetermined fourth slice level, means for performing a diagnosis as to whether or not said catalyst has deteriorated based on said ratio, and means for modifying said fourth slice level to a larger value when said diagnosis is being performed than when said diagnosis is not being performed.

* * * * *